United States Patent
Rodriguez et al.

(10) Patent No.: US 6,221,967 B1
(45) Date of Patent: Apr. 24, 2001

(54) PREFORMED MULTI-ACID ADDUCTS USEFUL FOR GRAFTING POLYOLEFIN POLYMERS

(75) Inventors: Manuel Soler Rodriguez, Houston; Charles Chiu-Hsiung Hwo, Sugar Land; Pui Kwan Wong, Houston; Pierre Nazareth Tutunjian, Houston; Charles Lee Edwards, Houston, all of TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/464,145

(22) Filed: Dec. 16, 1999

(51) Int. Cl.⁷ .......................... C08F 255/00; C08F 255/10
(52) U.S. Cl. ...................... 525/274; 525/293; 525/296
(58) Field of Search .................... 525/274, 293, 525/296

(56) References Cited

U.S. PATENT DOCUMENTS

| | | | |
|---|---|---|---|
| 4,018,702 | 4/1977 | Boffardi et al. | 252/389 |
| 5,071,880 | 12/1991 | Sugo et al. | 521/27 |
| 5,336,439 | 8/1994 | Forsberg et al. | 252/356 |
| 5,369,142 | 11/1994 | Culbertson et al. | 523/116 |
| 5,409,623 | 4/1995 | Mishra et al. | 252/47.5 |
| 5,582,955 | 12/1996 | Keana et al. | 430/296 |
| 5,594,062 | 1/1997 | Takemura et al. | 524/504 |
| 5,604,033 | 2/1997 | Arthurs et al. | 428/350 |
| 5,618,881 | 4/1997 | Hojabr | 525/64 |
| 5,651,927 | 7/1997 | Auda et al. | 264/85 |
| 5,744,429 | 4/1998 | Chung et al. | 508/221 |

FOREIGN PATENT DOCUMENTS

| | | |
|---|---|---|
| 731158 | 9/1996 | (EP) . |
| 02187143 | 7/1990 | (JP) . |
| 93/11175 | 6/1993 | (WO) . |
| 95/16719 | 6/1995 | (WO) . |
| 96/41824 | 12/1996 | (WO) . |
| 97/11144 | 3/1997 | (WO) . |

*Primary Examiner*—Jeffrey Mullis

(57) ABSTRACT

The present invention relates to reaction products formed from maleic anhydride and amino carboxylic acids. The reaction products are particularly useful for grafting polyolefins to increase their polarity and therefore enhance their physical properties.

5 Claims, No Drawings

PREFORMED MULTI-ACID ADDUCTS USEFUL FOR GRAFTING POLYOLEFIN POLYMERS

FIELD OF THE INVENTION

This invention relates to preformed adducts of multi-carboxylic acid and iminodiacetic acid. This invention also relates to polyfunctional polyolefins and more specifically to polyfunctional polybutene polymers. The invention is also directed to methods of introducing the proper level of functionality in polybutylene materials. The invention is further directed to polycarboxylic functionalized polyolefins and methods of making which include pre-forming of an adduct that contains at least three or more functional carboxylic acid groups which can then be grafted via a free radical initiated reaction to active sites in polyolefins such as polybutylene and polypropylene polymers.

The instant invention also provides a method for improving the polarity of polybutylene by grafting a small molecule, which contains several acid functional groups to the hydrocarbon backbone of polybutylene. The increased functionality offers an abundant potential for various choices of chemistry in polymer modification.

The present invention also relates to a process for producing a graft modified polyolefin having good adhesion to polar materials such as nylon, polyester, glass, metal, etc.

The invention further relates to a superior functionalized polybutylene which is suitable for several new application such as for hot melt adhesives and for emulsions. Applicants have discovered a new method which results in the grafting of small molecules of bi-functional N-substituted diacids to an unsaturated carboxylic acid, such as maleic anhydride, which can be grafted to polybutylene. The small chelate, iminodiacetic acid (IDA), is very effective because it is very reactive and can coordinate with most metals to form stable structures. The increased functionality of the grafted polymer provides higher adhesive strength in adhesive joints in a number of different substrates.

BACKGROUND OF THE INVENTION

Because of the unique set of properties of polyolefins such as polybutylene and polypropylene, particularly their high compliance compared to other polyolefins and their comparatively low melting temperature, a functionalized version becomes an excellent candidate to fill the requirements of a structural hot melt adhesive. Polybutylene without functional groups lacks the functionality or polarity needed for the adhesion to high surface energy substrates, a necessary characteristic for both hot melt adhesives and their constituents.

Polybutylene, like other polyolefins, has no functionality on the chain and therefore artifacts made from this polymer have very low surface free energy and can not be decorated by painting or printing. In the past, researchers have reacted functional groups on the surface of polyolefins by various means using highly oxidative techniques to induce bonding sites with reagents leaving hydroxyl or carboxyl groups. Also, melt reactions have been carried out to functionalize the bulk of the polyolefin material by a free radical initiated reaction induced by organic peroxides.

A large number of polymer companies commercially offer functionalized polyolefin materials such as acrylated and maleated polypropylene and polyethylene. Techniques used to modify these polymers provide one or, at most, two acid groups per grafting site. The present inventor has found that by increasing the number of functional groups to three or greater per grafting site one can substantially improve the polarity and hence improve the polymer's performance in several end use application.

Additionally, there is an ever increasing impetus to replace or supplement solvent-based polymer coating compositions with aqueous-based counterparts due to the environmental toxicity and flammability problems posed by the use of volatile organic solvents. However, even where aqueous-based polymer compositions have been devised, their production has usually entailed the intermediate use of organic solvents, requiring subsequent removal which is costly and time-consuming, or the incorporation of a certain amount of a solvent in the final composition which acts to ensure proper film-formation on coating (known as a coalescing solvent). There is therefore also now increasing pressure to significantly reduce or eliminate the volatile organic contents (VOCs) in aqueous-based polymer composition syntheses both as components in their production (even if subsequently removed) and in the resulting composition as an aid to film coalescence.

In the present invention, applicants have found unexpectedly that multi-carboxylic acid as the functional group can co-ordinate very effectively with most metals to form stable, e.g. octahedral, anionic complexes. For example, two moles of iminodiacetic acid contain four carboxylic acid groups, which can react with metal ions to form to have stability constant in excess of $10^{10}$. The introduction of carboxylic functionality into polyolefins allow for more water solubility as well as production of water borne products which are environmentally desirable.

SUMMARY OF THE INVENTION

The present invention is directed to a grafted polyolefin comprising the reaction product of: (a) a polyolefin which had been grafted with an unsaturated carboxylic acid anhydride or acid thereof; and (b) an amino carboxylic acid.

The instant invention is also directed to a grafted polyolefin comprising the reaction product of: (a) a polyolefin; and (b) an amino carboxylic acid.

The invention further relates to a grafted polyolefin comprising the reaction product of: (a) a polyolefin; (b) an unsaturated carboxylic acid anhydride or unsaturated carboxylic acid; and (c) an amino carboxylic acid.

The invention also describes a grafted polybutylene polymer comprising the free radical grafting reaction product of polybutylene and iminodiacetic acid.

In a further aspect of the invention, there is described a grafted polybutylene polymer comprising the free radical grafting reaction product of polybutylene and maleic anhydride further reacted with iminodiacetic acid.

The invention also provides (1) a compound (adduct), made by reacting maleic acid anhydride (ester) with iminodiacetic acid or a salt thereof and useful for grafting polyolefins, which compound has a formula selected from the group consisting of formula [1], [2], [3] below and mixtures thereof; (2) a process for making multifunctional polyolefins by grafting polyolefin such as polypropylene or polybutylene with such compound; and (3) a multifunctionalized polyolefin made by such process. The compound (adduct) formula selected from the group consisting of formula [I], [II], [III] below and mixtures thereof:

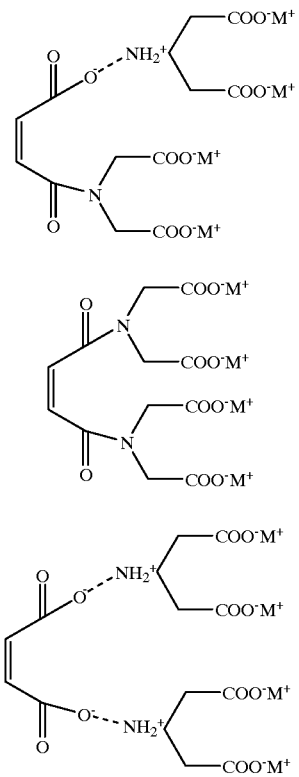

wherein M+ is Na+, K+, Li+, or Cs+

The compound (monomer) can also further react to form dimer, trimer and oligomer.

The invention further provides a grafted polybutylene homopolymer or copolymer having 1–50, preferably 1–30, more preferably 2–15 mole percent of an alpha olefin having from 2–8 carbon atoms, wherein the polybutylene is grafted with from about 0.01 to about 30, preferably from about 1 to about 15, more preferably from about 3 to about 10 weight percent of iminodiacetic acid The present invention also provides an adhesive composition comprising the multi-functional polyolefins, particularly multi-functional poly-1-butene, described above. Particularly, the present invention also provides an adhesive composition comprising the reaction product of (a) a polybutylene compound consisting of polybutylene modified by grafting thereto an unsaturated monomer bearing an acid, ester or acid anhydride group, with (b) an amino polycarboxylic acid compound or a salt thereof bearing at least one primary or secondary amine groups, which are reactive with the anhydride group.

The invention is also directed to an emulsion composition comprising: (1) 25 to 55 weight percent of a grafted polyolefin comprising the reaction product of (i) a polyolefin, (ii) an ethylenically unsaturated monomer having functionality capable of reacting with an amino group and (iii) an amino carboxylic acid or a salt thereof; (2) a minor amount up to 10 weight percent of a surfactant; and (3) 55 to 80 weight percent water.

DESCRIPTION OF THE PREFERRED EMBODIMENTS

While the present invention is described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims.

The preferred mode of grafting the polyolefins is via free-radical grafting using peroxide initiators although other initiators such as azo compounds can be used. The organic peroxides which may be suitably used in the present invention are those having a decomposition temperature of preferably from 80° C. to 230° C., preferably from 110° C. to 220° C. and more preferably from 110° C. to 210° C.

Particularly preferred organic peroxide compounds have half lives at 210° C. of from 1 to 30 seconds. Among these compounds, dicumyl peroxide, monocumyl tert-butyl peroxide, di-tert-butyl peroxide, 2,5-dimethyl-2,5-di-(tert-butylperoxy)-hexane and 2,5-dimethyl-2,5-di-(tert-butylperoxy)-hex-3-yne are particularly noteworthy. Other peroxides which can be used in the practice of the present invention include benzoylperoxide, acetylperoxidle, di-t-butylperoxide, t-butylperoxylaurate, dicumyl-peroxide, 1,3-bis(t-butylperoxyisoprypyl)benzene, 1-4-bis(t-butylperoxypropyl)benzene, 2,5-di-(t-butylperoxy)hexane, t-butylperoxybenzoate, -butyl-4,4-bis-(t-butylperoxy)-valerate, octanoylperoxide, p-methane hydroperoxide, and t-butylperoxyacetate; azobis-compounds such as azobisisobutylnitrile, 2,2-azobis(2,4,4-trismethyvaleronitrile), and 2,2-azobis(2-cyclopropylpropionitrile); inorganic peroxides such as potassium persulfate, sodium persulfate, and ammonium persulfate may be recited.

The free radical-generator is generally used in the process according to the invention in a sufficient quantity to make it possible to effect the grafting. Furthermore, it is desirable that the quantity should not exceed the minimum quantity needed because any excess of radical-generator results in a degradation of the polyolefin. The quantity is usually at least 0.005 parts by weight per 100 parts by weight of polyolefin; it is in particular at least 0.01 part by weight, values of at least 0.02 parts by weight being the most advantageous ones. In general the quantity does not exceed 1 part by weight per 100 parts by weight of polyolefin, preferably 0.5 parts by weight, values of not more than 0.1 being the most recommended ones, for example approximately 0.04 parts by weight.

The peroxide under proper temperature homolytically decomposes, generates a free radical which abstracts hydrogen from the tertiary carbon of the polyolefin polymer, thus providing a reaction site for vinyl monomers or other labile molecules. The reaction is characterized as a random free radical event reaction without any bias toward distribution along the polymer chain.

The polyolefin homopolymers or copolymers are modified by grafting with a radically polymerizable unsaturated grafting compound selected from the group consisting of vinyl-polymerizable, unsaturated, hydrolyzable silane compounds, carboxylic acids and derivatives, carboxylic acid anhydrides and derivatives, and mixtures thereof, in the presence of a free radical generator. In the present invention, the ethylenically unsaturated grafting monomer typically contains a functional group capable of reacting with an amino functional group.

The vinyl-polymerizable unsaturated, hydrolyzable silanes used in this invention contain at least one silicon-bonded hydrolyzable group, such as, for example, alkoxy, halogen, and acryloxy, and at least one silicon-bonded vinyl-polymerizable unsaturated group such as, for example, vinyl, gamma-methacryloxypropyl, alkenyl gamma-acryloxpropyl, 6-acryloxyhexyltriethoxysilane, alkyloxypropyl, ethynyl, and 2-propynyl and preferably is an ethylenically unsaturated group. Any remaining valances of silicon not satisfied by a hydrolyzable group or a vinyl-polymerizable unsaturated group being satisfied by a monovalent hydrocarbon group, such as, for example, methyl, ethyl, propyl, isopropyl, butyl, pentyl, isobutyl, isopentyl, octyl, decyl, cyclohexyl, cyclopentyl, benzyl, phenyl, phenylethyl, and naphthyl. Suitable silanes of this type include those represented by the formula:

$$R_a SiX_b Y_c$$

wherein R is a monovalent hydrocarbon group, X is a silicon-bonded hydrolyzable group, Y is a silicon-bonded monovalent organic group containing at least one vinylpolymerizable unsaturated bond, a is an integer of 0 to 2, preferably 0; b is an integer of 1 to 3, preferably 3; c is an integer of 1 to 3, preferably 1; and a+b+c is equal to 4.

Suitable vinyl polymerizable unsaturated hydrolyzable silanes that can be used in this invention include, but are not limited to, 3-acryloxypropyltriethoxysilane, ethynyltriethoxysilane, 2-propynyltrichlorosilane, 3-acryloxypropyidimethylchlorosilane, 3-acryloxypropyidimethylmethoxysilane, 3-acryloxypropylmethyldichlorosilane, 3-acryloxypropyltrichlorosilane, 3-acryloxypropyltrimethoxysilane, allyldimethylchlorosilane, allylmethyidichlorosilane, allyltrichlorosilane, allyltriethoxysilane, allyltrimethoxysilane, chloromethyldimethylvinylsilane, [2-(3-cyclohexenyl)ehtyl]dimethylchlorosilane, 2-(3-cyclohexenyl)ethyltrimethoxysilane, 3-cyclohexenyltrichlorosilane, diphenylvinylchlorosilane, diphenylvinylethoxysilane, (5-hexenyl) dimethylchlorosilane, (5-hexenyl)dimethylchlorosilane, 5-hexenyltrichlorosilane, methacryloxpropyldimethylchloro-silane, 3-methacryloxypropyld imethylethoxysilane, 3-methacryloxypropylmethyidiethoxysilane, 3-methacryloxypropyltrichlorosilane, methyl-2-(3-cyclohexenyl)ethyldichlorosilane, methyl-3-(trimethylsiloxy)crotonate, 7-octenyltrichlorosilane, 7-octenyltrimethoxysilane, 1-phenyl-1-trimethylsiloxyethylene, phenylvinyidichlorosilane, styrylethyltrimethoxysilane, 13-tetradecenyltrichlorosilane, 4-[2-(trichlorosilyl)ethyl]cyclohexene, 2-(trimethylsiloxy) ethylmethacrylate, 3-(trimethylsilyl)cyclopentene, vinyldimethylchlorosilane, vinyldimethylethoxysilane, vinylethyidichlorosilane, vinylmethyldiacetoxysilane, vinylmethyidichlorosilane, vinylmethyldiethoxysilane, vinyltrimethylsilane, vinyltrichlorosilane, vinyltriethoxysilane, vinyltrimethoxysilane, vinyltris (betamethoxyethoxy)silane, vinyltriacetoxysilane, 3-methacryloxypropyltrimethoxysilane, and 3-methacryloxypropyltris(beta-methoxyethoxy)silane.

The preferred silane compounds are vinyltrichlorosilane, vinyltriethoxysilane, vinyltrimethoxysilane, vinyltris(beta-methoxyethoxy)silane, vinyltriacetoxysilane, 3-methacryloxypropyl trimethoxysilane, 3-methacryloxypropyltris(beta-methoxyethoxy)-silane, and mixtures thereof. These compounds are preferred due to commercial availability, ease of use, as well as good polymer property improvement.

The radically polymerizable unsaturated grafting compound also can be a carboxylic acid or an anhydride thereof, with about three to about 10 carbon atoms, with preferably at least one olefinic unsaturation, and derivatives thereof. Examples of the carboxylic acid and anhydride include, but are not limited to, an unsaturated monocarboxylic acid such as acrylic acid or methacrylic acid; an unsaturated dicarboxylic acid such as maleic acid, fumaric acid, itaconic acid, citraconic acid, allyl succinic acid, mesaconic acid, glutaconic acid, Nadic acid (norbornene-2,3-dicarboxylic acid), methyl Nadic acid, tetrahydrophthalic acid, or methyl-hexahydrophthalic acid; an unsaturated dicarboxylic anhydride such as maleic anhydride, itaconic anhydride, citraconic anhydride, allyl succinic anhydride, glutaconic anhydride, Nadic anhydride (norbornene-2,3-dicarboxylic anhydride), methyl Nadic anhydride, tetrahydrophthalic anhydride, or methyltetrahydrophthalic anhydride; or a mixture of 2 or more thereof. Of these unsaturated carboyxic acids and acid anhydrides thereof, maleic acid, maleic anhydride, Nadic acid, methyl Nadic acid, methyl Nadic anhydride, or Nadic anhydride is preferably used. The most preferred anhydride is maleic anhydride.

The quantity of graftable functional monomer used in the process according to the invention depends on the properties which it is intended to obtain in the grafted polyolefin, the quantity of radical-generator used and the residence time of the mixture in the reactor. It is generally sufficient to permit an improvement in the properties of the grafted polyolefin obtained. In practice there is no interest in using an excessive quantity because any excess beyond the quantity needed to obtain the maximum degree of grafting does not bring about any improvement in the finished product. The quantity is usually at least 0.01 part to 20 parts by weight per 100 parts by weight of polyolefin; it is preferably at least 0.1 part to 17 parts by weight; and most preferably 1 part to 15 parts by weight per 100 parts of polyolefin. Values of at least 10 parts by weight are the most commonplace. In general the quantity does not exceed 20 parts by weight per 100 parts by weight of polyolefin; in most cases it does not exceed 17 parts by weight, with values not exceeding 15 parts by weight being those most recommended.

The other reactive component used in the practice of the present invention is an amino carboxylic acid and more preferably an amino polycarboxylic acid. Typically, the amino carboxylic acid has the formula $HNR_2$ or $H_2NR$ wherein R is a carboxy functionalized aliphatic group containing 1–8 carbon atoms. The R group can also be a carboxy functionalized aromatic group such as aryl or naphthyl. Illustrative non-limiting examples of the amino carboxylic acids include glycine, glycylglycine, alanine, valine, leucine, isoleucine, phenylalanine, tyrosine, proline, hydroxyproline, serine, threonine, 3-amino-3-methylbutanoic acid, 6-aminocaproic acid, aminobenzoic acid (meta and para), 4-aminosalicylic acid, iminodiacetic acid, lanthionine, methionine, aspartic acid, glutamic acid, lysine, delta-aminiolevulinic acid, beta-alanine, alpha-aminobutyric acid, gamma-aminobutyric acid, gamma, epsilon-diaminopimelic acid, gamma, alpha-diaminobutyric acid, ornithine, omega-aminododecanoic acid, beta-cyanoalanine, epsilon-methylhistidine, canavanine, djenkoic acid, 1-azaserine, gamma-methylene glutamic acid, N-methyl tyrosine, arginine, tryptophan, norvaline, cystine, cysteine, imidazole4,5-dicarboxylic acid and hydroxylysine. The preferred amino carboxylic acid is an amino polycarboxylic acid with iminodiacetic acid being the most preferred. Other amino polycarboxylic acids that can be used are selected from the group consisting of beta-alanine diacetic acid, ethylene diamine triacetic acid, diethylene triamine pentaacetic acid, trans-1,2-diamino cyclohexane triacetic acid.

The amount of the amino carboxylic acid or a salt thereof that is used in the present invention depends on the level of final functionality that is desired for a given industrial application. In the case where the polyolefin is first grafted with a the reactive unsaturated monomer, the amount used is at least sufficient to functionalize 50% of the reactive groups. For example, in the case of a maleic anhydride grafted polyolefin, at least one mole of amino carboxylic acid per grafted anhydride moiety is used. Of course, the full stoichiometric amount of amino polycarboxylic acid can be used to fully react all of the grafted anhydride moieties.

When the amino carboxylic acid or its salts is grafted directly, the quantity of graftable material used in the process according to the invention depends on the properties which it is intended to obtain in the grafted polyolefin, the quantity of radical-generator used and the residence time of the mixture in the reactor. It is generally sufficient to permit an improvement in the properties of the grafted polyolefin obtained. In practice there is no interest in using an excessive quantity because any excess beyond the quantity needed to obtain the maximum degree of grafting does not bring about any improvement in the finished product. The quantity is usually at least 0.01 part to 20 parts by weight per 100 parts by weight of polyolefin; it is preferably at least 0.1 part to 17 parts by weight; and most preferably 1 part to 15 parts by weight per 100 parts of polyolefin. Values of at least 10 parts by weight are the most commonplace. In general the quantity does not exceed 20 parts by weight per 100 parts by weight of polyolefin; in most cases it does not exceed 17 parts by weight, with values not exceeding 15 parts by weight being those most recommended.

The polyolefins used in the instant invention include but not limited to polypropylene homopolymer and copolymer, polyethylene homopolymer and copolymer(including low density products to high density products), poly-1-butene homopolymer and copolymer, poly-4-methyl-1-pentene homopolymer and copolymer, ethylene-propylene copolymer elastomer, propylene-1-butene copolymer resin or elastomer, and propylene4-methyl-1-pentene copolymer resin or elastomer. Among them, the preferred starting material for the production of modified products is polybutylene.

The polybutylene referred to herein is one butene-1 polymer containing from 80% preferably from 95% and more preferably from 97% by weight of isotactic portions. The weight average molecular weight may range from about 10,000 to about 1,000,000; determined by gel permeation Chromatography. Suitable poly-1-butene also have a density of from 0.875 to 0.925, preferably from 0.900 to 0.920 and most preferably from 0.910 to 0.915. Suitable poly-1-butenes have melt indices in the range of from 0.1 to 5,000, preferably from 0.1 to 200, more preferably from 0.4 to 20, and most preferably from 1.0 to 5 dg/min, as determined by ASTM D-1238 Condition E, at 190° C. The intrinsic viscosity of the poly-1-butene may range from 0.07, preferably from 7 at 130° C. in "decalin" (decahydronaphthalene).

These poly-1-butene polymers including their methods of preparation, and their properties are known in the art. An exemplary reference containing additional information on polybutylene is U.S. Pat. No. 4,960,820 which is herein incorporated by reference.

A poly-1-butene polymer (PB) usable herein is either a butene-1 homopolymer or a copolymer or a terpolymer. If a butene-1 copolymer is used, the non-butene comonomer content is from 1 to 50 mole %, preferably from 1 to 30 mole % of either ethylene, propylene, or an alpha olefin having from 5 to 8 carbon atoms. The poly-1-butenes can be modified to increase surface activity by reaction with, for example, maleic anhydride.

Suitable poly-1-butenes can be obtained, for example, in accordance with Ziegler-Natta low-pressure polymerization of butene-1, e.g. by polymerizing butene-1 with catalysts of $TiCl_3$ or $TiCl_3$—$AlCl_3$ and $Al(C_2H_5)_2Cl$ at temperatures of 10–100° C., preferably 20–40° C., e.g. according to the process described in DE-A-1,570,353. It can also be obtained, for example by using $TiCl_4$—$MgCl_2$ catalysts. High melt indices are obtainable by further processing the polymer by peroxide cracking, thermal treatment or irradiation to induce scissions leading to a higher melt flow material.

Duraflex.R. DP0200, a polybutylene polymer produced by Shell Chemical Company, of Houston, Tex. is a particularly suitable polymer. This polymer is a homopolymer with a melt index of 2.0 g/10 min. at 190° C. and 2.16 kg and a weight average molecular weight of 439,000.

Further polybutylene polymers and copolymers that are useful in making the new grafted polymers of the present invention are those disclosed in U.S. Pat. Nos. 4,568,713; 5,594,074 and 5,847,051 whose entire contents are incorporated by reference herein.

The graft reaction is preferably carried out in a melt processing reactor such as single or multiple screw extruders, rubber masticators, Banbury processors, Brabender processors, roll-mills and the like.

In carrying out the grafting process of the present invention, the ethylenically unsaturated monomer and peroxide reagents should be mixed with the polyolefin preferably before the polyolefin is heated, and most preferably the ethylenically unsaturated monomer and the peroxide free radical initiator should be mixed prior to adding such mixture to the polyolefin. Although use of a solvent is not required for mixing the reagents with polyolefin, using an inert, low molecular weight, volatile solvent, such as pentane, hexane, or other hydrocarbons, or methylethyl ketone, acetone, or other low molecular weight species, or any other suitable liquid, to coat the polymer with the reagents, can improve the mixing of the reagents and improve the dispersion of the reagent mixture on the polyolefin when so used. The mixture of peroxide initiator and ethylenically unsaturated monomer is added to the polyolefin to coat the polymer with such components of the mixture. If a solvent is used as a coating and dispersion aid for the reagents, after the mixture is coated onto the polyolefin the solvent is evaporated from the polymer, leaving the ethylenically unsaturated monomer and peroxide reagents on the surface of the polyolefin.

The reaction temperature for practicing the invention are typically in the range of 125–250° C. Good results are obtained at temperatures of about 180–230° C., but preferably 180–220° C. The longer the time that the polyolefin is subjected to the reaction temperature, namely the preferred temperature of 180–220° C., the greater will be the amount of grafted ethylenically unsaturated monomer, without further degrading the molecular weight of the polyolefin.

In the first preferred embodiment of the invention, the new polymers of the instant invention are made by the method shown in scheme 1. As shown in scheme 1, polybutylene is first grafted (step 1) with maleic anhydride using a free radical initiator such as a peroxide. Subsequent to the maleation step, the grafted polymer is reacted with iminodiacetic acid to give a polymer having two or more functional moieties per grafting site whether one uses one or more moles of iminodiacetic acid.

SCHEME 1

Step 1. Maleation of Polybutylene chain

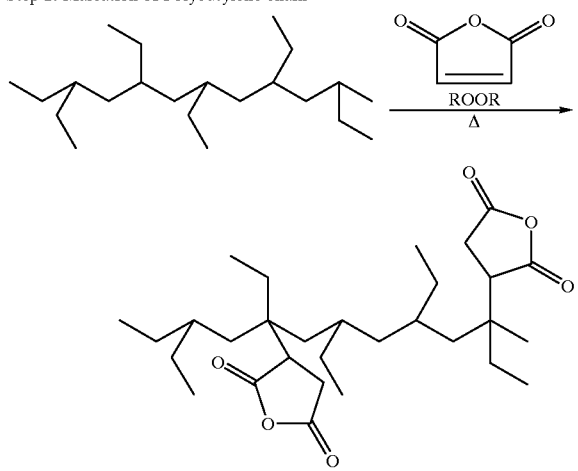

Step 2. Reaction of product of step 1 with iminodiacetic acid

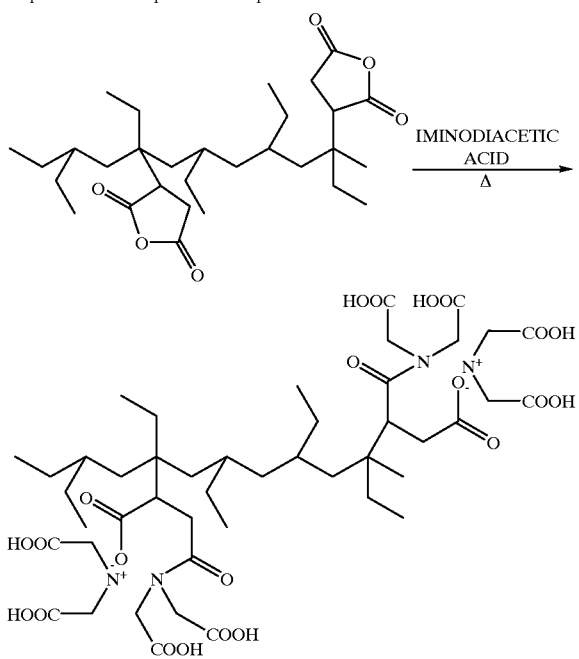

Although applicants does riot wish to be bound to any theories or mechanisms, it was assumed that iminodiacetic acid prefers to react only with the acid groups of maleated polybutylene, but in fact the reaction is random. The imi- nodiacteic can also react with active tertiary carbons as shown in scheme 2. Applicants have calculated that in a 5% maleated polybutylene molecule of a million molecular weight unit there could be approximately 300 potentially active carbon atoms per maleic molecule grafted to the polybutylene backbone, thus providing substantially more active carbon for which the iminodiacteic acid can react. It is also possible that maleic anhydride may also be grafted onto the secondary carbon atoms of the polybutylene back- bone.

In the second preferred embodiment as shown in scheme 2, the polybutylene is directly grafted with the iminodiacetic acid also using a peroxide free radical initiator. The peroxide generates free radicals that initiate the site for reaction with iminodiacetic acid yielding two acid groups per grafting site. The iminodiacetic acid is grafted onto the tertiary carbon atoms of the polybutylene backbone. It is also possible that the iminodiacetic acid may also be grafted on to the secondary carbon atoms of the polybutylene backbone.

SCHEME 2

One step Addition of Iminodiacetic Acid to Polybutylene Chain

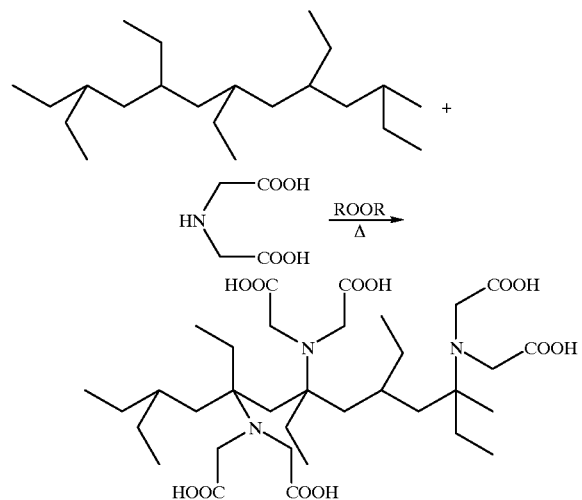

In the third preferred embodiment shown in scheme 3, an adduct of maleic anhydride and iminodiacetic acid is pre- formed and then reacted with via peroxide free radical grafting with the polybutylene. It should be noted that the preformed adduct can also be made with the acid or ester instead of the anhydride. The resulting adduct can have carboxamide bonds as well as acid-base adduct bonds depending on whether the adduct is further heated to gen- erate the carboxamide bonds.

SCHEME 3

Pre-forming the adduct and then grafting 2 moles of neutralized iminodiacetic acid per mole of maleic anhydride are reacted to form an adduct monomer and can be grafted on to polyolefin, specifically polybutylene.

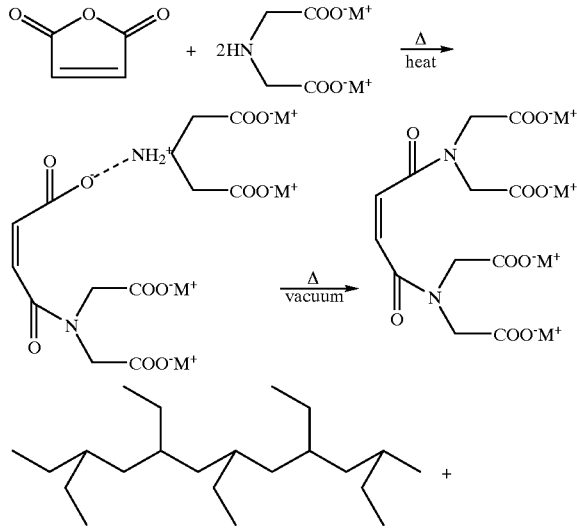

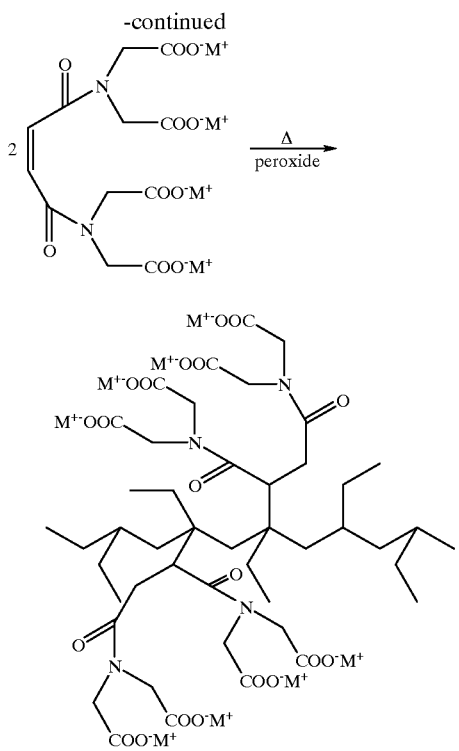

wherein M+ is Na+, K+, Li+, or Cs+

There are certain advantages to adduct formation prior to grafting. The reaction sequence can be discussed as follows: In a two to one mole ration of iminodiacetic to maleic anhydride the first mole of iminodiacetic acid can react to form an amide linkage (carbonyl-nitrogen bond). The second mole reacts with the acid moiety to form an ionic bond with the nitrogen forming the quaternary nitrogen. Under vacuum and heat one iminodiacetic acid (condensation), thus forming a molecule that has four carboxylic acid groups attached to the maleic anhydride via amide bonds.

Adduct formation as shown in scheme IIII can be accompanied by the formation of dimers (see below) and trimers of the adduct. The ratio of monomer to dimer to trimer can be controlled by the reaction conditions (temperature and reaction time), addition of Lupersol 101, as well as use of the salt form of the iminodiacetic acid to form the monomer.

Adduct Dimer (I)

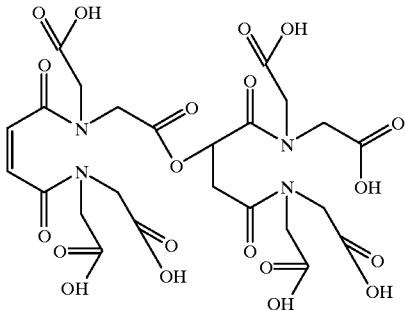

The adduct dimer is formed by reaction of one of the pendant acid groups of a monomer adduct with the α, β unsaturated amino functionality of another monomer adduct. This acid catalyzed nucleophilic addition of heteroatoms to an α, β unsaturated carbonyl group is an example of the Michael addition reaction. This addition reaction is facilitated by the presence of the acid groups, high temperature and long reaction times. However, it should be rioted that dimer and trimer adduct formation can be significantly minimized, if desired, by neutralization of the iminodiacetic acid prior to reaction with any base, or by use of the salt (e.g. sodium, potassium salts) of the iminodiacetic acid in the initial adduct formation. This prevents the Michael addition reaction, because the carboxylate anion does not readily add to an α, β unsaturated carbonyl group.

Next is the compound obtained by following the same reaction sequence as for the dimer but adding up to 2500 ppm of Luppersol 101 before heating the mixture. Trimer formation:

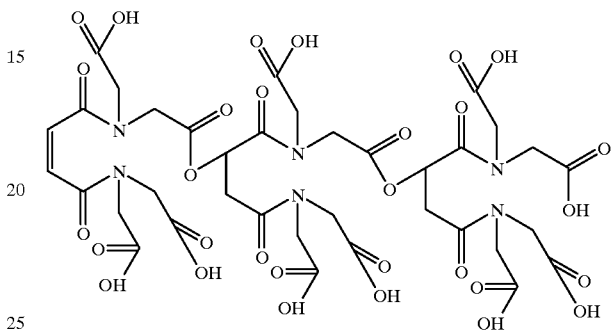

The method illustrated in scheme 3 is used to further enhance the functionality of the adduct. For example, since the nitrogen atoms of the iminodiacetic is basic it should react with acid groups of the adduct molecule. Therefore, three moles of iminodiacetic acid added to one mole of maleic anhydride can react under heat and vacuum to form five acid groups etc. The resulting structure can look like a dendrite. It is also conceivable that by using an acid catalyst and adjusting the reaction conditions one could form a oligamer >(100)n having the basic structural of the dimer or trimer, but still maintain the olefinic group of the maleic anhydride that is needed for the grafting to the polymer backbone. The grafting of a pre-formed adduct containing multiples functional groups of carboxylic acid to the polymer's backbone would provide means to achieve high levels of polarity to the polybutylene polymer.

The polyfunctional polyolefin compositions of this invention can be bonded to a polar material by heating at least the multifunctional polyolefin composition to melt, and then joining them together, preferably under pressure. For example, when the polar material is not thermoplastic, there can be employed a method which comprises coating or laminating a molten polyfunctional polyolefin composition onto the polar material; a method comprising superimposing both together, and then melt-bonding them under heat; a method comprising adhering the polyfunctional polyolefin composition to the polar material by electrostaticity and then melting the polyfunctional polyolefin composition to laminate it on the polar material; and a method comprising heating the polar material to a temperature above the melting point of the polyfunctional polyolefin composition, and then adhering the polyfunctional polyolefin composition thereto and simultaneously melting it. Where the polar material is thermoplastic, there can be used a method which comprises melting both the polyfunctional polyolefin composition and the polar material and coextruding and laminating them, and a method which comprises coating or laminating the molten polyfunctional polyolefin composition onto the polar material.

Although pre-treatments of one or both surfaces of the adherents, such as a flame treatment, a corona discharge treatment, and/or coating of a primer, are not required in bonding the polyfunctional polyolefin composition of this invention to polar materials, the adherents may be so treated, if desired.

Several batches of polyfunctional polybutylene were made and evaluated to test whether the increased polarity of polybutylene offers a performance advantage as well as diversity in end use application compared to other functionalized or non-functionalized polymers.

When the polyfunctional polyolefin composition of this invention is bonded to polar materials, both initial adhesiveness and durable adhesiveness can be enhanced over the case of using polyfunctional polyolefins graft-modified with unsaturated carboxylic acids or their derivatives. Hence, the laminates or composites obtained can be used for long periods of time under more severe service conditions. The composition of this invention finds many uses such as rustproof coatings or hot melt adhesives for metal tubes or plates, and laminate or composite films and sheets, and containers, tubes and bottles which are useful as packaging materials for foods, liquids, and medicines. The adhesive properties of the polyfunctional polybutylene of the present invention are summarized in Table 1.

TABLE 1

PROPERTIES OF MODIFIED POLYBUTYLENE IN ADHESIVES

| I.D. NO.<br>(MODIFIED) POLYMER | 03TAG001<br>PB8910 PC<br>NEAT | LR20878-52<br>PB8910 PC +<br>Acrylic Acid | LR20878-90<br>PB8910 PC +<br>MA-IDA | LR20878-91<br>B8340 +<br>MA-IDA |
|---|---|---|---|---|
| LAP SHEAR, psi | | | | |
| Steel to Steel | 133 | 430 | 508** | 1320 |
| Aluminum to Aluminum | 38 | 142 | 415** | 1540 |
| PVC to PolyVinylChloride | 67 | 91 | 240 | n/a |
| G-10[1] to G-10 | 118 | 430 | 498 | n/a |
| HDPE to HDPolyEthylene | n/a | n/a | 50 | n/a |
| PS to PolyStyrene | n/a | n/a | 119 | n/a |
| PP to PolyPropylene | n/a | n/a | 300 | n/a |
| S.A.F.T.(1Kg) ° C. | 89 | n/a | 84 | n/a |
| Viscosity @ 177° C., cps | 650–1050 | 600 | n/a | n/a |
| Softening Point, ° C. | | | n/a | n/a |
| Grafted Moiety: | | | | |
| % w acrylic acid | 0 | 11.4 | 0 | 0 |
| % w maleic anhydride | 0 | 0 | 6 | 6 |
| % w iminodiacetic acid | 0 | 0 | 12 | 12 |

Steel and aluminum preheated to 50° C.
**Not preheated to 50° C.
Resins applied at 182° C.
Crosshead speed was 12 inches/minute.
[1]Meets N.E.M.A. FRA Requirements
8910 PC - 6% w ethylene
8340 - 0.75% w ethylene The data reported in Table 1 were obtained without any special surface treatment for the aluminum or the stainless steel with the exception of wiping the metal surfaces with isopropanol to remove grease or surface contamination. It is clear that the polybutylene materials which were further modified with iminodiacetic acid, particularly the modified 8340 grade polymer, have substantially better adhesion to steel and aluminum compared to the acrylated grafted polybutylene polymer as well as the non-modified polymer. There is also ample evidence from this data that useful levels of strong adhesion can be achieved with a variety of polar and non-polar polymeric substrates. This coupled with the peel strength data in Table 2 shows the clear advantage, which can be achieved in selected polybutylene materials with the free radical grafting of iminodiacetic acid.

TABLE 2

PEEL STRENGTH ON ALUMINUM

| RESIN | ID. NO. | *PEEL<br>lbs/in. | %<br>Maleic | %<br>IDA | Acrylic<br>acid |
|---|---|---|---|---|---|
| PB8910 PC(control) | 20878-68-1 | 0.064 | 0 | 0 | 0 |
| P88910 PC(1:1) | 20878-68-3 | 2.98 | 6 | 6 | n/a |
| PBO800 (1:2) | 20878-73 | 3.29 | 6 | 13.9 | n/a |
| POLYBOND(1001) | lot #0A50008 | 4.79 | | n/a | ~5 |
| PB8910 PC(1:2) | 20878-75 | 7.09 | 6 | 15.4 | 0 |

TABLE 3

LAP SHEAR PROPERTIES OF MODIFIED
POLYBUTYLENE BY PRE-FORMED
ADDUCT ADDITION

| I.D. NO. | LR20878-105-1 | LR20878-105-3 |
|---|---|---|
| BASE RESIN | PB8340 | PB8340 |
| % OF MALEIC ANHYDRIDE | ~7.0 | ~6.0 |
| % OF IDA | 0.0 | ~15.9 |
| Lapshear, psi | 1226 | 1911 |

In a fourth preferred embodiment, the functionalized polybutylene of the present invention can be processed under high shear in a mixture of water and a suitable surfactant and can be made into a film forming emulsion. Coating from these emulsions has lower undesirable volatile components than solvent borne coating. The superior functionalized polybutylene is suitable for several new application such as for hot melt adhesives and for emulsions. Applicants have discovered a new method, which extends the state of the art beyond that of maleic anhydride grafting and yields improved functionality in polybutylene. This method results in the grafting of a small molecules of bifunctional n-substituted diacids to a maleic anhydride which can be grafted to polybutylene. The small chelate, iminodiacetic acid (IDA), because it is very reactive and can coordinate with most metals to form stable structures. The increased functionality of the grafted polymer provides higher adhesive strength in adhesive joints in a number of different substrates.

The emulsion are typically made by mixing together at least one grafted polyolefin, water and emulsifying agent to form a mixture. The materials are then stirred under high shear conditions at an effective temperature to achieve proper emulsification.

The emulsions prepared according to the present invention generally contain 25 to 55 weight percent of grafted polyolefin, with a weight percent of grafted polyolefin of 40–55% being the most preferred.

Exemplary of the emulsifying agents, whether used alone or in admixture, are the traditional anionic agents such as the alkali metal salts of fatty acids, alkyl sulfates, alkylsulfonates, alkylarylsulfonates, sulfosuccinates, alkyl phosphates, abietic acid salts, whether or not hydrogenated, nonionic agents such as polyethoxylated fatty alcohols, polyethoxylated and optionally sulfated alkylphenols, polyethoxylated fatty acids, etc. The emulsifying agents are advantageously employed in a proportion of 0.1% to 10% by weight relative to the total weight of the grafted polyolefin. The most preferred amount of surfactant or emulsifying agent is 3 to 8%.

The amount of water in the emulsion generally varies, depending upon the desired concentration, but is generally between 50–80 weight percent, preferably between 55–80 weight percent and most preferably between 60 and 75 weight percent.

Applicants have synthesized emulsions based on the grafted products of the present invention. Two emulsions were prepared, one containing grafted acrylic acid and the other one containing the adduct of maleic anhydride with iminodiacetic acid. The properties of the emulsions are summarized in Table 4.

TABLE 4

| EMULSION PRODUCT CHARACTERISTICS | | |
|---|---|---|
| I.D. NO. | LR20878-129 | LR20878-130 |
| BASE RESIN | PB8910 | P88910 |
| % OF MALEIC ANHYDRIDE | 0.0 | ~6.0 |
| % OF IDA | 0.0 | ~16.3 |
| % ACRYLIC ACID | 12 | 0.0 |
| TOTAL SOLIDS | 50.5 | 49.0 |

Glue from emulsions of functionalized PB or PP can be made quite easily. The carboxylic acid groups attached to the polymer's backbone can react readily with bases such as hexamethyldiamine etc. to cross-link and reduce set-up time.

The grafted polyolefins of the instant invention can be used in the following additional industrial applications:

(1) Thermoset resins wherein a water soluble amine such as hexamethylenediamine reacts with the carboxylic acid portions of the polymer to cross-link under curing conditions.

(2) Hot melt adhesives as shown in Table 1.

(3) The grafted polyolefins can be blended with other polar engineering resins and act as coupling or compatibilizer to improve processability. They can also be blended with polar tackifying resins as well as other nonpolar olefinic polymers as adhesion promoters.

(4) The grafted polyolefins can be used in extrusion processes to prepare tie-layers multilayer constructions with other polymers, such as PB/tie-layer/polyamide.

(5) The grafted polyolefins of the present invention can also be converted into ionomers by neutralization with bases such as ZnO or $Mg(OH)_2$.

EXAMPLES

Preparation of Acrylated Polybutylene: 11.4% by Weight I.D. No.: LR20878-52

The equipment used to conduct this preparation is a two-liter glass vessel with three female 24/40 joints. One inlet is fitted with a chilled condenser, a second inlet set-up with a mechanical stirrer and a third inlet has a thermocouple probe to measure melt temperature. The reaction is conducted under a nitrogen blanket and the reactor vessel placed inside a heating mantle (Glas—Cole) temperature controlled with Eurotherm model 847. The starting materials are polybutylene (having a viscosity of 6,000 to 15,000 and designated as PB 8910 PC; and acrylic acid monomer, neat obtained from Aldrich Chemical.

To the glass vessel reactor there is added 270 g of PB8910 PC and the temperature is raised to 120° C. Once the temperature is stabilized stir at a constant 50 rpm for 15 minutes. Add slowly 33 ml of acrylic acid to the melt and stir at 50 rpm for 15 min. Raise the temperature slowly (1–2° C./min) to 205° C. and stir for an additional 15 minutes.

The resulting product is then poured into a Teflon® coated pan and allowed to cool. The product did not exhibit monomer odor.

Example 2

Polyfunctionalized Polybutylene: 12% W of Iminodiacetic Acid I.D. No.: LR20878-90

The reactor vessel and setup for this example is identical to that of Example 1. The Chemicals used are: a polybutylene identical to the one used in Example 1 (PB 8910 PC) Maleic Anhydride, briquettes 99%, from Aldrich Chemical Co., Iminodiacetic Acid, free acid 97%, ICN and Lupersol 101, neat.

To the glass vessel there is added 564 g of PB8910 PC and the temperature is raised to 110° C. while maintaining a nitrogen blanket and stirring gently at 50 rpm. Add slowly 0.12 ml of neat Lupersol 101 while stirring. Under a nitrogen blanket add slowly 36 g (0.367 moles) of maleic anhydride and keep stirring until maleic anhydride has completely dispersed and melted. Stir for an additional 10 minutes and while maintaining a nitrogen blanket add slowly 82.9 g (2×0.367 moles) of iminodiacetic acid(IDA). Stir until the IDA has dispersed and slowly raise the temperature (1–2° C./min) to 210° C. Gassing is observed, maintain temperature and stirring (50 rpm) until gassing subsides (10 minutes). Torque was measured to be 70–90 oz-in at 50 rpm. The product is poured into Teflon® coated pans and allow cooling.

Example 3

Polyfunctionalized Polybutylene: 12% W of Iminodiacetic Acid I.D. No.: LR20878-91

The reactor vessel and setup for this example is identical to that of Example 1. The Chemicals used are: a polybutylene identical to the one used in Example 1 (PB 8910 PC) Maleic Anhydride, briquettes 99%, from Aldrich Chemical Co., Iminodiacetic Acid, free acid 97%, ICN and Lupersol 101, neat.

Add 564 g of PB 8340 to a reactor vessel which was pre-purged with nitrogen and also preheated to 125° C. Allow the pellets to melt and begin stirring at 4 rpm. Add 2.54 ml of Lupersol 101 and stir until the peroxide is dispersed. Add 36 g of maleic anhydride while maintaining a nitrogen blanket The addition of IDA was done in two steps:

Step 1.

The temperature was raised to 180° C. and half (~41.45 g) of the IDA is added to the mixture slowly while maintaining a nitrogen environment. Stir to disperse the IDA.

Step 2.

Add the rest of the IDA to a total of 82.9 g and raise the temperature to 210° C. and stir for 18 minutes. No outgassing observed. Torque was measured at about 310 oz-in at 17 rpm. The product is poured into a Teflon® coated pan and allowed to cool.

Example 4

Preparation of the Pre-formed Adduct LR20878-122

Large Batch

Into a three necked flask there is added 100 g of maleic anhydride and 271.36 g of iminodiacetic acid. Stir at 50 rpm and gently purge with dried nitrogen. Provide a reflux tube and a positive nitrogen gas flow while raising the temperature slowly to 200° C. Pull a vacuum and collect condensate. Pour the product into Teflon® coated pan and allow to cool.

Example 5

Synthesis of Acrylated Polybutylene ID. NO. LR. 20878-119

The reaction was processed in a 2 gallon stainless steel autoclave Parr reactor with computer pressure and temperature control. The reactor was cleaned and assembled with the reactor bottom drain valve pointed toward the front of the reactor stand.

1496.0 g of Polybutylene polymer (solid beads, 87.9 1% of the total reactants) was directly poured into the open reactor and the reactor was sealed. The reactor was pressurized to 50 psig with chromatographic nitrogen, the pressure was released and the reactor was pressurized for another two times. The reactor was purged with nitrogen at about 3 liter/minute for 20 minutes to remove oxygen and moisture, the reactor was then closed with nitrogen shut off; and heating was started. The Polybutylene was heated to 120° C. and melted. Stirring was started and the speed was 50 rpm. Nitrogen was purged at about 1 liter/min. at atmospheric pressure inside the reactor. At 124° C. 1.70 g of free radical initiator Lupersol 101 (liquid, 1000 ppm of the total reactants) was added by injecting into the reactor through the pressure gauge manifold using a glass syringe, the pressure gauge was put back on the reactor and sealed with Teflon® tape. Nitrogen was pressurized into the reactor to 50 psig and released to remove any oxygen and moisture introduced into the reactor during the initiator addition. Nitrogen was closed and the initiator was stirred into the liquid polymer.

The reactor temperature was equilibrated at 133° C., nitrogen was purged again at about.1 liter/min. at atmospheric pressure inside the reactor. The stirrer speed was 60 rpm. 204 g of acrylic acid (liquid, 11.99% of the total reactants) was added at about 133° C. into the reactor by pouring it through the pressure gauge manifold in three minutes, using a narrow-stem glass funnel. Cool acrylic acid solidified the polybutylene regionally and caused the stirring to stop. It was later discovered that the dip tube inside the reactor was bent. The dip tube was replaced, the reactor was reassembled and purged with nitrogen for 5 minutes before the temperature exceeded 140° C. and the reaction was continued. The stirrer speed was increased to 290 rpm.

The heater set point of the reactor was increased to 200° C. with the temperature controller set point at 60–80%. The reactor was pressurized to 50 psig and the reactor was heated at a rate of about 1.5° C./min. When the temperature reached 200° C., timing was started. The reaction was fast and was completed in 12 minutes at 200–210° C.

The product removal was immediately prepared; it included with heating the bottom ram drain valve with a heat gun and positioning two Teflon®-lined drain pans under the reactor drain. After 10 minutes expired, the bottom drain valve was immediately opened and the reactor was pressurized to 100 psig with nitrogen to remove the product at 210° C. The nitrogen inlet valve was shut off when the reactor pressure reached 100 psig.

The reaction product, 10–12% functionality of acrylated polybutylene, was white, strong-sticky solid polymer at room temperature; it shrunk in ice-water and could be peeled off from the Teflon®-lined drain pans. The product has approximately the following physical properties: mp 90° C., viscosity 700 cP at 177° C.

The resulting acrylated polybutylene was cryogenically grounded and the particle size for each kind of ground samples was 200–1000 pm under 400× optical microscope.

Example 6

Synthesis of: Polyfunctional Polybutylene ID. NO. LR 20878-120

Before the synthesis reaction, 1500 g of polybutylene was used to wash down the reaction residue from Example 3 at 120–130° C. (stirred at 120° C., 300 rpm for 30 minutes, mixture was drained out at 120° C. at 100 psig). Safety precautions were taken.

The reaction was also processed in a two gallon stainless steel autoclave Parr reactor with computer pressure and temperature control. After the reactor was cleaned-up with polybutylene, the bottom drain valve was closed. 1321.0 g of Polybutylene polymer (77.63% of the total reactants) was poured into the reactor through the rupture disk port using a plastic funnel, the reactor was sealed with no gas leaking. The reactor was pressurized to 50 psig with chromatographic nitrogen, the pressure was released and the reactor was pressurized for another two times. The reactor was purged with nitrogen at about 3 liter/minute for 20 minutes to remove oxygen and moisture. Just before the passage of 20 minutes purging time, the reactor was closed and heating was started.

The polybutylene was heated to 120° C. and melted. Stirring was started and the speed was 50 rpm. Nitrogen was purged at about 1 liter/min, at atmospheric pressure inside the reactor. When the temperature reached 135° C., 1.7119 g of the free radical initiator Lupersol 101 (1006 ppm of the total reactants) was added by injecting it into the reactor through the pressure gauge manifold using a glass syringe with stirring speed 160 rpm, the pressure gauge was put back on the reactor sealed with Teflon® tape. Nitrogen was pressurized into the reactor to 50 psig and released to remove any oxygen and moisture introduced into the reactor during the initiator addition. Nitrogen was closed and the initiator was stirred into the liquid polymer.

The temperature was up to 150° C. and the reactor was kept at this temperature, nitrogen was purged again at about 2 liter/min. at atmospheric pressure inside the reactor. 379 g of maleic anhydride derivative with iminodiacetic acid (yellow powder, 22.28% of the total reactants). The adduct was identified as 20878-120A. The adduct was added by pouring it through the rupture disk port using a plastic funnel in 15 minutes, the reactor was closed with nitrogen shut off; heating was continued and the stirring speed was increased to 296 rpm.

The heater set point of the reactor was increased to 200° C. with the temperature controller set point at 60–80%. The reactor was pressurized to 50 psig and the reactor was heated at a rate of about 1.5° C./min. When the temperature reached 200° C., timing was started, the reaction was fast and was completed in 10 minutes at 200–210° C. The product removal was immediately prepared as the same as for synthesis of Example 5. After 10 minutes have expired, the bottom drain valve was immediately opened and the reactor was pressurized to 60 psig with nitrogen to remove the product into two Teflon®-lined drain pans at 210° C. The nitrogen inlet valve was shut off when the reactor pressure reached 60 psig.

The reaction product, polyfunctional polybutylene, was a yellow strong-sticky solid polymer at the room temperature; it shrunk in ice-water and could be peeled off from the Teflon® lined drain pans.

The resulting functionalized polybutylene was cryogenically grounded and the particle size for each kind of ground samples was 200–1000 µm under 400× optical microscope.

Example 7

Emulsification of Acrylated Polybutylene ID NO 20878-128

A 14 speed Osterizer blender (maximum 1100 ml volume) was used to emulsify the ground acrylated polybutylene.

539.42 g of distilled ionized water (49.04% of the total reactants) was charged into a 1.0 liter beaker, 66.0 g of surfactant No.23W004 (a colorless, viscous liquid provided by Shell Chemical Company at Westhollow Research Center, Houston, Tex.; 6% of the total reactants) was added slowly into the beaker while stirring. The surfactant-water mixture was poured into the blender.

494.58g of the sample (ID. NO. LR. 20878-119) of mono-functional acrylated polybutylene (white powder, 44.96% of the total reactants) was charged into the blender by portions. After each portion was poured into the blender, the blending was turned on, and the stirring was quickly increased to the highest speed. Vigorous stirring prevented the mixed material from agglomeration. "Pulse" function on the blender was used to release air bubbles inside the mixture after each time of stirring. It took 1 hour to emulsify all the acrylated polybutylene into white milky water mixture, the highest temperature reached inside the blender while blending the mixture was 53° C.

The product particle size was mostly in the range of 20–40 µm with very small number of oversized particles. The particle size was analyzed using 400× Bausch & Lomb optical microscope. The viscosity of the product was 1275 centipoise at room temperature, which compares well with the expected value (greater than 1000 centipoise).

Homogenization was attempted by using a HC-8000 3A sanitary pneumatic microfluidizer from the Microfluidics International Corporation. The microfluidizer was modified to stand 75 psig in line nitrogen pressure and 120° C.–130° C. fluid temperature, and it can reduce the particle size repeatedly with 9000 psig highest pressure even it was designed for 8000 psig maximum.

The microfluidizer was assembled and cleaned. The air pump was primed using distilled ionized water at 15 psig dry air pressure. The pump was primed until no air bubbles were observed. Pure water was used to test the working condition of the microfluidizer with air pressure set up at 110 psig, constant 4000–5000 psig pressure in line in front of the homogenizer module was observed during the test. Temperature rise-up in the homogenizer module was approximately 1.5° C./1000 psig.

The feed reservoir was wrapped with heating tape controlled by a variac, and the reservoir was heated to 65° C. The warm (53° C.) emulsified polybutylene was immediately poured into the warm feed reservoir, then the air control valve was opened, homogenization was started. A small stream of the homogenized polymer was collected in a clean beaker, but quickly the polymer-water mixture plugged the homogenization unit. The homogenizer module was reversed to clean the lines and returned back to the normal position, but the mixture plugged again. The unit is designed to allow particles less than 200 µm pass.

The small stream of homogenized product was combined with the emulsified product and analyzed. The total amount of the acrylated polybutylene produced was 780 g (expected to be about 1100 g). The loss of the product was due to the heat-up in the homogenization process

Example 8

Emulsification of Ground Polyfunctional Polybutylene: LR 20878-129

The same 14 speed Osterizer blender was used to emulsify the ground polyfunctional polybutylene. The blending was divided into two batches, with the same amount of the emulsified polymer produced (smaller volume in the blender made blending easier and more efficient).

294.0 g of distilled ionized water (49.0% of the total reactants) was charged into a 1.0 liter beaker, 36.0 g of the surfactant No.23W004 (6.0% of the total reactants) was added slowly into the beaker while stirring. The surfactant-water mixture was poured into the blender.

270 g of polyfunctional polybutylene, id. no. LR20878-(yellow powder, 45% of the total reactants) was charged into the blender by portions. The same procedure was followed to emulsify the mixture as emulsification of ground acrylated polybutylene. It took 40 minutes to emulsify all the acrylated polybutylene into yellow milky water mixture, the highest temperature reached inside the blender while blending the mixture was 56° C.

The product particle size was mostly in the range of 10–30 µm with very small number of oversized particles. Some particles were reduced to 5 µm in size. This showed the polyfunctional polybutylene was emulsified much better than the non-functional acrylated polybutylene. The particle size was analyzed using the same optical microscope.

The same batch was repeated the second time and the same product was achieved. The total amount of the polyfunctional polybutylene produced was 1120 g.

Example 9

A modified polyethylene is made in accordance with the practice of the present invention by initially preheating 42 parts of low density polyethylene to a temperature of 110° C. The polyethylene was agitated for a period of about 5 minutes and a mixture of 1 part of the adduct of maleic anhydride and iminodiacetic acid and 0.042 part of dicumyl peroxide was added to the polyethylene while it was stirred. After the mixture was agitated for two minutes, the temperature of the mixture was raised to 165° C. The resulting melt was then agitated for an additional 10 minutes and then the molten polyethylene was removed. Based on method of preparation, there was obtained maleic anhydride-iminodiacetic acid modified polyethylene. The identity of the product is confirmed by its infrared spectrum and oxygen analysis.

Example 10

Grafting of Polybutylene with Iminodiacetic Acid

Using a Brabender processor, 12 g of iminodiacetic acid and 48 g of polybutylene (PB8910 PC) are reacted as follows: Add 48 g of PB containing 2500 ppm of Lupersol 101 to mixing head and heat to about 125° C. Then add slowly 12 g of iminodiacetic acid and allow to mix for 15 minutes. The temperature of the mixture is then raised to 220° C. for 15 minutes while stirring is maintained at 60rpm. The product is removed from the mixing head and allowed to cool.

NMR analysis of the resulting grafted material exhibits an extra aliphatic chemical shift peak at about 32 ppm (not seen in physical mixture). The new peak is attributable to quaternary carbon formed by the grafting of the IDA with the concomitant proton loss from the CH carbon of the polybutylene.

It will be apparent from the foregoing that many other variations and modifications may be made regarding the new polymers described herein, without departing substantially from the essential features and concepts of the present invention. Accordingly, it should be clearly understood that the forms of the inventions described herein are exemplary only and are not intended as limitations on the scope of the present invention as defined in the appended claims.

Example 11

Preparation of Dimer ID. No.: LR24319-193

Into a three necked 500 ml flask there is added 25 grams of maleic anhydride pre-mixed with 67.9 g of iminodiacetic acid. The center joint contained reflux tube with chilled water. The other two 24/40 joints one had thermoweld to fit a k- type thermocouple the other was fitted with a stopcock. The temperature was slowly raised at 0.66° C./min. to 180° C. using an Eurotherm 808 Controller. The temperature was held constant for one hour and then raised to 230° C. at 0.66 C./min. and held there for 1 hr. A slight vacuum was pressed on the mixture for about 3–4 min. Product was poured into Teflon® coated tray and allowed to cool. Sample was sent to the NMR lab for analysis. See scheme III.

Example 12

Preparation of Trimer LR 24319-194

The reaction setup was similar to one discussed in EXAMPLE 11. Pre-mixed 25 grams of maleic anhydride and 67.9 grams of iminodiacetic acid. To the mixture prior to heating we added 2500 ppm of Lupersol 101. The mixture was mixed well before heating. The heating was done in two steps, the temperature was raised at 0.66° C./min to 140 C. held there for 1 hour and then the temperature was raised to 180° C. at a rate of 0.66° C./min. After holding the temperature for one hour a vacuum was applied to the mixture for 4–5 min. Vacuum was broken with nitrogen as product was poured into Teflon® coated tray and allowed to cool.

Example 13

Preparation of Monomer LR. NO. 24319-194K

Same glassware arrangement was used in this set up as in examples 11,12

Neutralization of the Aminodiacetic Acid

Neutralization of the aminodiacetic acid was done prior to the reaction with the maleic anhydride.

Procedure

Into a 1000 ml beacker weigh 67.9 grams of the IDA. Add approximately 300 grams of methanol and stir. Add slowly 147 ml of 3 N KOH. Allow mixture to react while stirring for 30 min. at room temperature. Filter the product using a Whatmann paper no. 1. After filtration wash product with three aliquots of chilled diethyl ether. Place product in oven set at 80 C. for one hour.

Preparation of the Monomer

Into a three necked 500 ml flask there is added 26.6 grams of maleic anhydride pre-mixed with 56.4 g of potassium iminodiacetic acid. The center joint contained reflux tube with chilled water. The other two 24/40 joints one had thermoweld to fit a k- type thermocouple the other was fitted with a stopcock. The temperature was slowly raised at 0.66 C./min. to 180° C. using an Eurotherm 808 Controller. The temperature was held constant for one hour and then raised to 230° C. at 0.66 C./min. and held there for 1 hr. A slight vacuum was applied to the mixture for about 3–4 min. Product was poured into a Teflon coated tray and allowed to cool.

What is claimed is:

1. A multifunctional polyolefin made by grafting a polyolefin with compound(s) selected from the group consisting of [I], [II], [III], and mixtures thereof, wherein [I], [II], and [III] have the following formula:

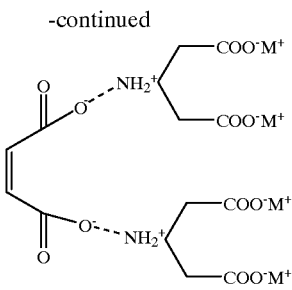

wherein $M^+$ is $Na^+$, $k^+$, $Li^+$, or $Cs^+$.

2. A multifunctional polyolefin made by grafting a polyolefin with a compound made by reacting maleic acid, ester or anhydride with an amino carboxylic acid or its salt.

3. The multifunctional polyolefin as described in claim 2, wherein said amino carboxylic acid is iminodiacetic acid.

4. The multifunctional polyolefin as described in claim 1, wherein said polyolefin is a poly-1-butene homopolymer or a poly-l-butene copolymer.

5. The multifunctional polyolefin as described in claim 2, wherein said polyolefin is a poly-1-butene homopolymer or a poly-1-butene copolymer.

* * * * *